(No Model.)   3 Sheets—Sheet 1.
E. R. CHENEY.
STONE DRESSING MACHINE.
No. 307,093.   Patented Oct. 28, 1884.
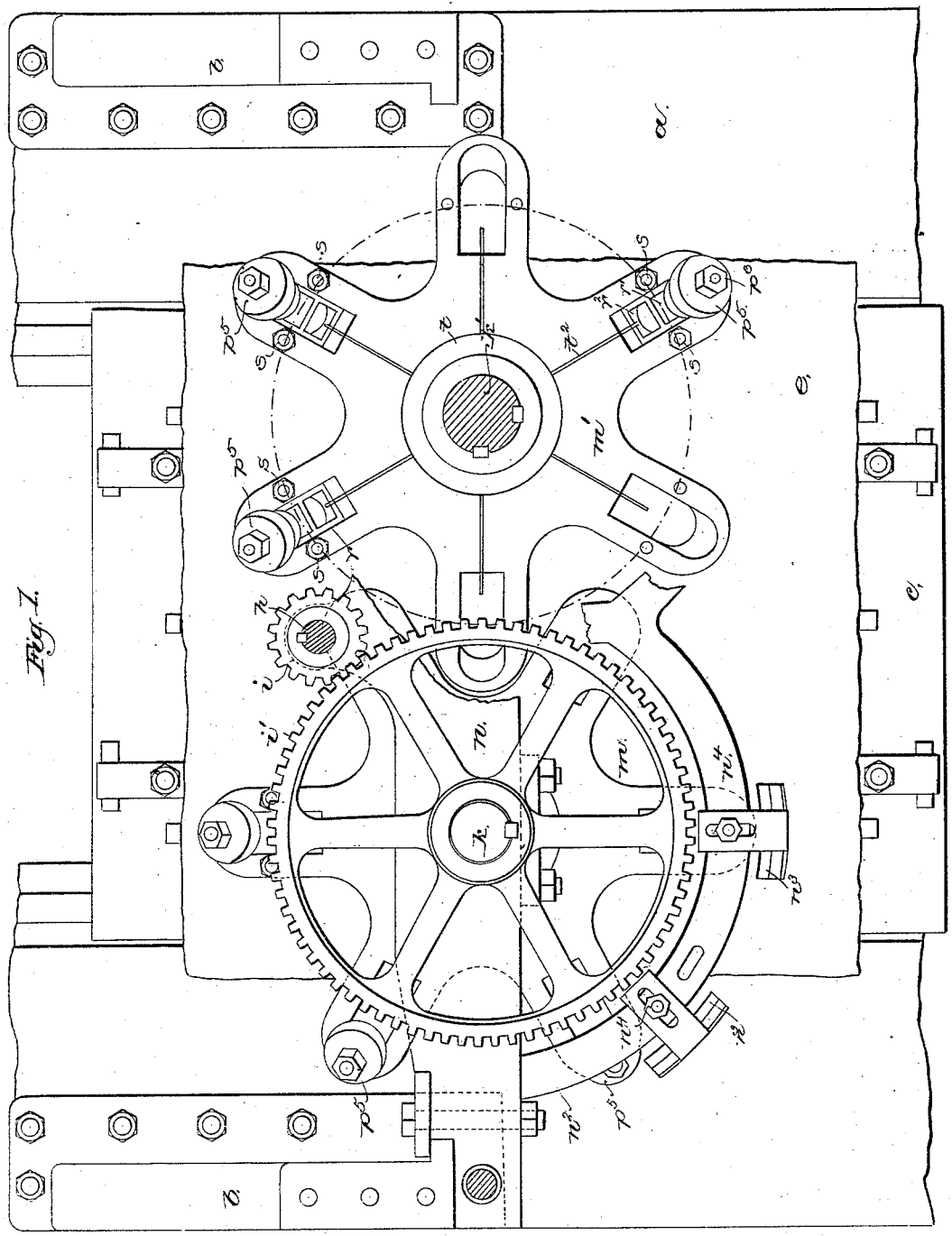
Fig. I.
Witnesses.
John F. C. Prinkert.
Arthur Tipperton.
Inventor.
Ethan R. Cheney,
by Crosby Gregory
attys.

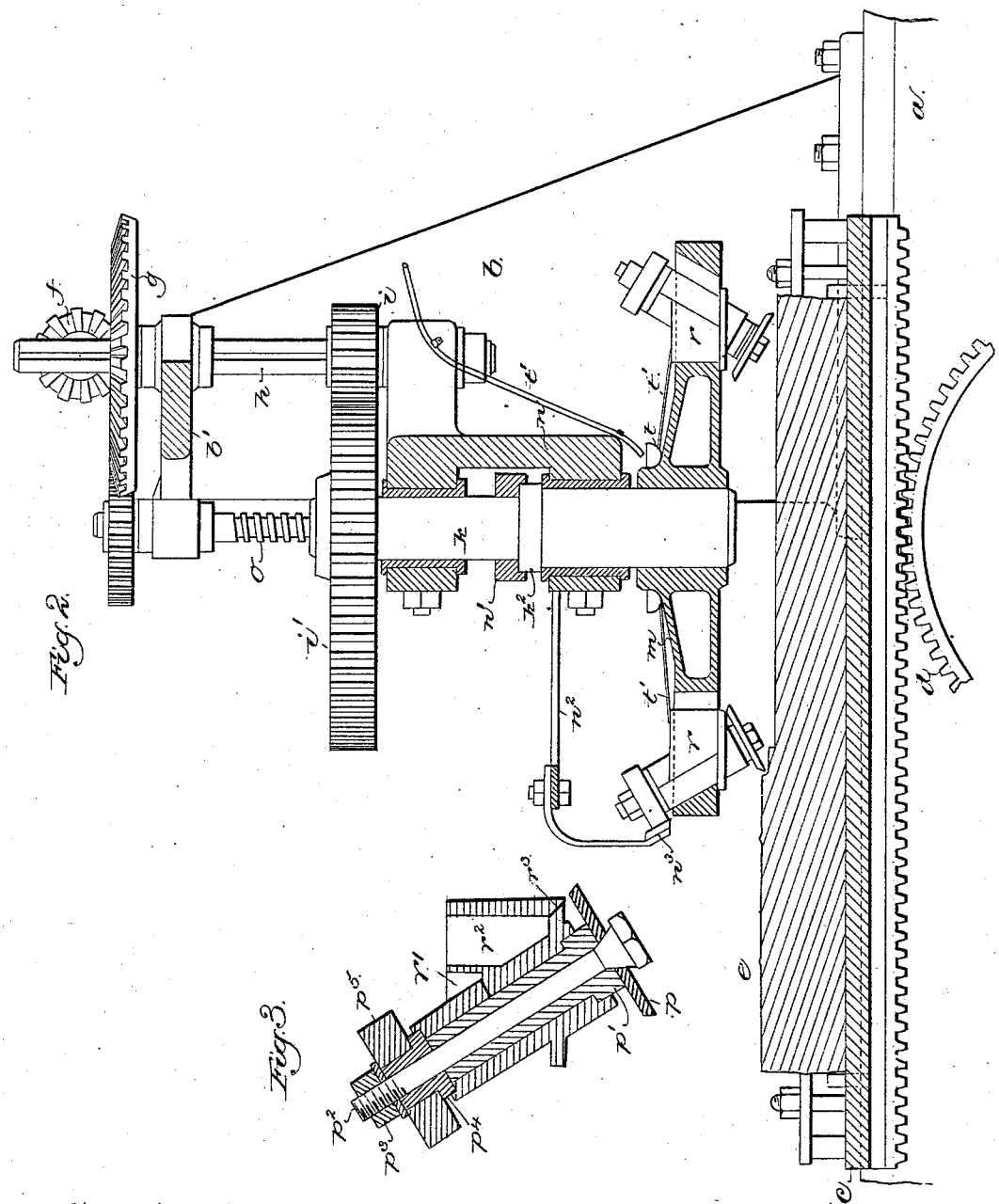

(No Model.) 3 Sheets—Sheet 3.
E. R. CHENEY.
STONE DRESSING MACHINE.
No. 307,093. Patented Oct. 28, 1884.
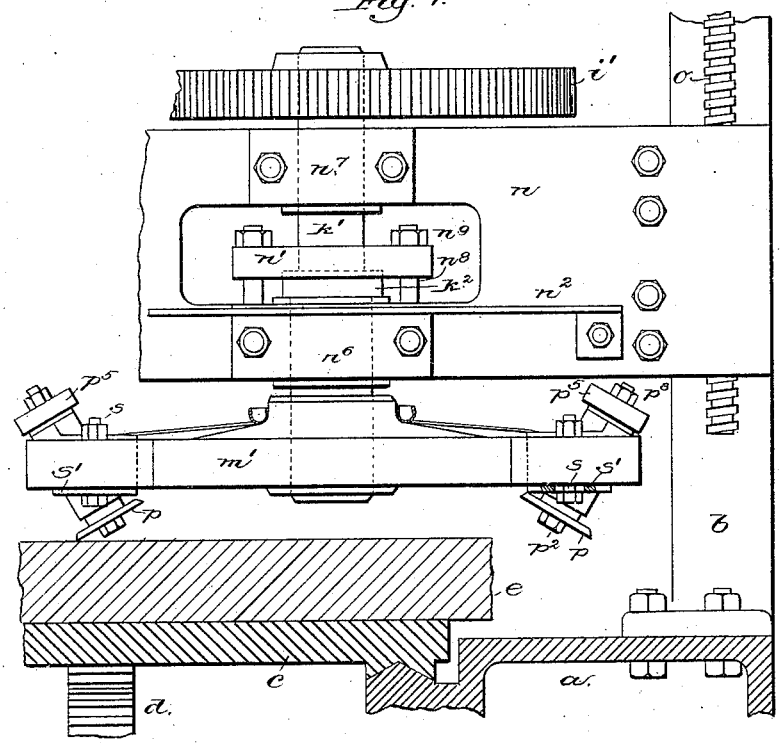
Witnesses.
John F. C. Printert
Henry Marsh.
Inventor.
Ethan R. Cheney,
by Crosby Gregory attys.

UNITED STATES PATENT OFFICE.

ETHAN R. CHENEY, OF CHELSEA, MASSACHUSETTS.

STONE-DRESSING MACHINE.

SPECIFICATION forming part of Letters Patent No. 307,093, dated October 28, 1884.

Application filed November 5, 1883. (No model.)

*To all whom it may concern:*

Be it known that I, ETHAN R. CHENEY, of Chelsea, county of Suffolk, State of Massachusetts, have invented an Improvement in Stone-Dressing Machines, of which the following description, in connection with the accompanying drawings, is a specification, like letters on the drawings representing like parts.

My invention relates to a machine for dressing flat surfaces of stone, and is embodied in a machine of that class in which the cutters, consisting of rotary disks, are revolved by rotating cutter-carrying heads, thus moving over and acting upon the surface of the stone in a curved path, the stone itself being mounted on a bed or carriage and fed toward the cutters in the manner of a metal-planing machine. The rotating disk-cutters are free to rotate on their spindles, and in their movement over the surface of the stone are turned by their contact with the stone, rolling, as it were, upon its surface, thus having the peculiar cutting action of a rolling edge. When, however, the cutters first strike the surface of the stone in machines as heretofore generally constructed, the rolling action does not immediately begin, and greater strain is brought upon the cutter than during its subsequent action when the rolling or rotary movement is going on.

One of the objects of the present invention is to prevent such additional strain upon the cutter when first beginning to operate upon the stone; and it consists in the combination, with the cutter, of a device for imparting a rotary movement to it when first arriving at the surface of the stone; and the invention also consists in details of construction to be hereinafter pointed out. Means are also provided for keeping the cutters and their bearings cool and lubricated.

Figure 1 is a plan view, partly in horizontal section, of an apparatus for dressing stone embodying this invention; Fig. 2, a vertical longitudinal section thereof; Fig. 3, a sectional detail of one of the cutters and its holding device; and Fig. 4, a partial sectional view showing a portion of the supporting upright for the cutter mechanism, only two of the cutters being shown.

The main frame-work $a$, provided with uprights $b$, supporting the tool-operating mechanism, and the bed or carriage $c$, with its feeding mechanism $d$, for presenting the stone $e$ to the cutters, may be of any suitable or usual construction.

The cutter-actuating shaft, driven by a belt or otherwise, is provided with a pinion, $f$, meshing with a gear, $g$, splined upon a shaft, $h$, passing through a bearing in a cross-piece, $b'$, (not shown in Fig. 1,) connecting the uprights $b$, the said shaft $h$ carrying a pinion, $i$, meshing with a gear, $i'$, mounted on a shaft, $k$, having fixed upon it the cutter-head $m$, for revolving the rotating cutters.

The gear $i'$ meshes with a similar gear, (indicated in dotted lines, Fig. 1,) which is mounted on a shaft, $k'$, carrying a cutter-head, $m'$, the gears being equal, so that the heads $m$ $m'$ rotate in unison in opposite directions, each having a series of slotted arms, which arms each enter the space between two arms of the other head in their rotation, so that the circles traversed by the ends of the said arms intersect or overlap one another.

The shafts $k$, $k'$, and $h$ have two bearing-boxes, $n^6$ $n^7$, (see Fig. 4,) in a beam, $n$, mounted on vertical guides in the upright $b$, and being movable up and down by means of screws $o$, to enable the tools to act on thicker or thinner pieces of stone, the shaft $h$ moving longitudinally through the gear $g$ as the beam $n$ is thus raised or lowered.

The shafts $k$ $k'$ are provided with collars $k^2$, preferably forged and turned as an integral part of the shaft, by which their weight is supported on the lower bearing, $n^6$, on the beam $n$, and the upper sides of the said collars are engaged by blocks $n'$, which receive the upward thrust on the shafts derived from the reaction of the stone against the cutters. The said blocks are connected with the beam by bolts $n^8$, the nuts $n^9$ of which may be screwed down as the parts wear away, so as to always maintain a tight bearing on the collars $k^2$, so as to prevent shake or end movement of the shaft $k'$ with relation to the beam $n$, a result that could not readily be attained if the upward thrust were sustained by a collar or shoulder of the shaft $k'$ bearing against the under side of one of the boxes $n^6$ or $n^7$.

The cutters $p$ are fixed upon hollow spindles $p'$, rotating freely in blocks $r$, adapted to be fastened by bolts $s$ passing through slotted flanges $s'$ (see Fig. 4) in adjusted position in the slotted arms of the heads $m\ m'$. The cutters $p$ are fastened on the spindle $p'$ by bolts $p^2$ passing longitudinally through the said spindle, the nut $p^3$ of the said bolt acting upon a collar, $p^4$, interposed between it and the end of the spindle $p'$.

A roller, $p^5$, is fastened upon the outside of the collar $p^4$ and rotates with the spindle and cutter. The rollers $p^5$ are preferably made of rubber or material affording a good frictional surface, and the cross-beam $n$ is provided with a frame, $n^2$, supporting friction devices $n^3$, (not shown in Fig. 4,) adjustably connected therewith by bolts $n^4$, the said devices engaging the rollers $p^5$ in their revolution at the ends of the arms of the carriages $m$, just before the cutters arrive at the surface of the stone, thus setting the cutters in rotation with their spindles $p'$ before striking the stone, so that they have the proper rotary movement when first beginning to act. The said friction devices $n^3$ and rollers $p^5$ constitute the cutter-turning devices, and may be arranged to operate during the entire revolving movement of the cutters; but they are only needed at the points where the cutters begin to act upon the surface of the stone, as the rotary movement will then be kept up by the stone itself. The path traversed by the cutters carried by one of the heads intersects that of the cutters carried by the other head, so that the two series of cutters act upon the entire surface of the stone.

The bearing-blocks $r$ for the spindles $p'$ of cutters are chambered, as best shown in Fig. 3, they preferably having two independent chambers, one of which, $r'$, is intended to be filled with a lubricant and has a passage leading to the bearing-surface of the cutter-spindle. The other chamber, $r^2$, is intended to be filled with water for the purpose of keeping the bearing cool and preferably being provided with a discharge-orifice, $r^3$, from which the water is permitted to drop upon the edges of the disk-cutters, keeping them cool and the surface of the stone moistened.

In order to provide a constant supply of water for the chambers $r^2$ while the machine is in operation, the cutter-heads $m\ m'$ are provided with central annular reservoirs, $t$, into which water may be delivered through a suitable pipe, $t'$, connected with the frame-work, the said reservoir being provided with a series of ducts, $t^2$, extending along the arms of the cutter-heads to the chambers $r^2$ of the blocks $r$.

I claim—

1. In a stone-dressing machine, the revolving cutter-head $m$ and its shaft, provided with the fixed collar $h^2$, combined with the beam $n$, to support the weight of the said shaft, and the block $n'$, located above the said collar and adjustably connected with the beam $n$, to resist the upward pressure on the said shaft when the cutters are in operation, and prevent endwise movement of the said shaft, substantially as described.

2. In a stone-cutting machine, the rotating disk-cutters and their spindles, combined with bearing-blocks for the said spindles, each chambered to constitute a water-receptacle, substantially as and for the purpose described.

3. The cutter-head having radial arms, provided with chambered bearing-blocks and rotating disk-cutters and their spindles in said blocks, combined with a central chamber on the said cutter-head, and radial ducts leading therefrom to the chambered blocks, substantially as described.

4. The rotating disk-cutter and spindle therefor, combined with a bearing-block for said spindle, having chambers, as described, one chamber for a lubricant and communicating with the spindle-bearing surface, and the other chamber having an orifice through which its contents are discharged upon the cutters, substantially as described.

In testimony whereof I have signed my name to this specification in the presence of two subscribing witnesses.

ETHAN R. CHENEY.

Witnesses:
JOS. P. LIVERMORE,
W. H. SIGSTON.